United States Patent [19]
McMillen

[11] Patent Number: 4,621,298
[45] Date of Patent: Nov. 4, 1986

[54] DUAL VOLTAGE DISTRIBUTION TRANSFORMER WITH INTERNAL VARISTOR SURGE PROTECTION

[75] Inventor: Charles J. McMillen, Hickory, N.C.

[73] Assignee: General Electric Company, King of Prussia, Pa.

[21] Appl. No.: 739,631

[22] Filed: May 31, 1985

[51] Int. Cl.⁴ .............................................. H02H 7/04
[52] U.S. Cl. ........................................ 361/38; 361/40;
 361/111; 361/118
[58] Field of Search ...................... 361/35, 38, 39, 40,
 361/111, 118; 336/70; 323/346

[56] References Cited
U.S. PATENT DOCUMENTS 3,211,956 10/1965 Dornbush ............................. 361/40
3,855,521 12/1974 Kiuchi ................................. 323/346
4,441,149 4/1984 Hase ................................. 323/346 X

FOREIGN PATENT DOCUMENTS 2421728 11/1975 Fed. Rep. of Germany ........ 361/40

Primary Examiner—A. D. Pellinen
Assistant Examiner—Derek S. Jennings
Attorney, Agent, or Firm—William Freedman; Robert A. Cahill

[57] ABSTRACT

A dual voltage distribution transformer is protected by an internally installed, multi-rated surge arrester which is selectively connected with plural primary windings by a dual voltage switch such as to establish a high surge voltage protection level when the primary windings are connected in series by the switch and a correspondingly lower surge voltage protection level when the primary windings are connected in parallel by the switch.

16 Claims, 4 Drawing Figures

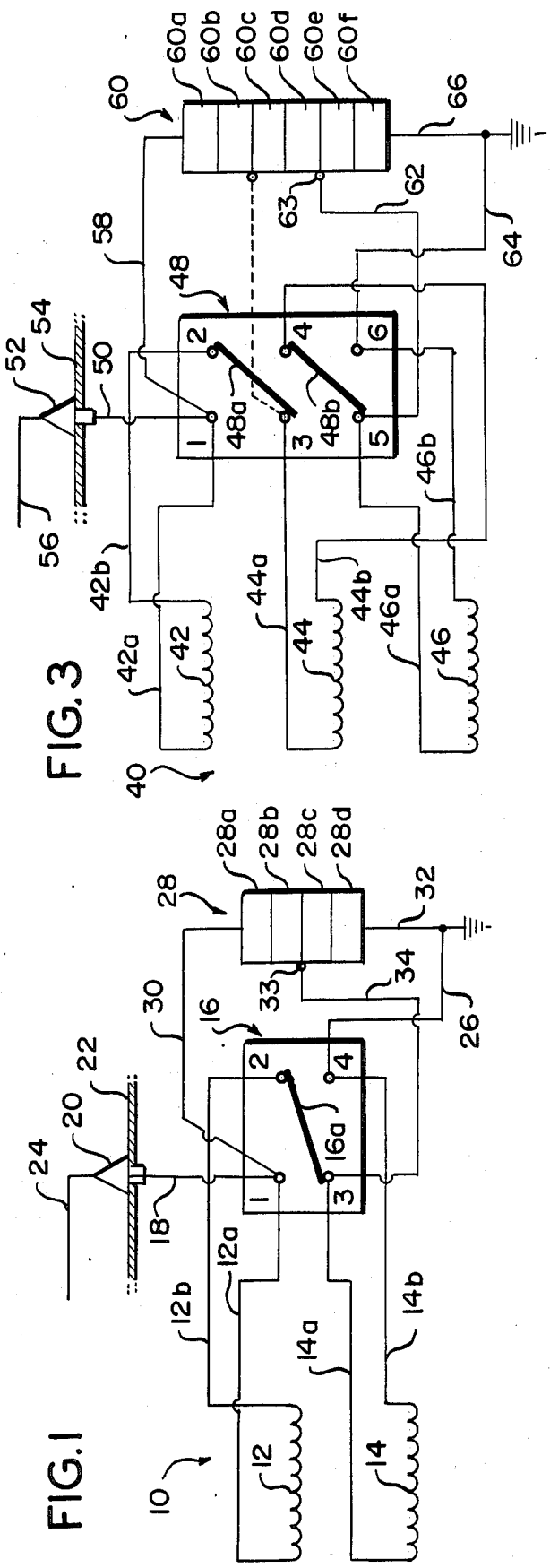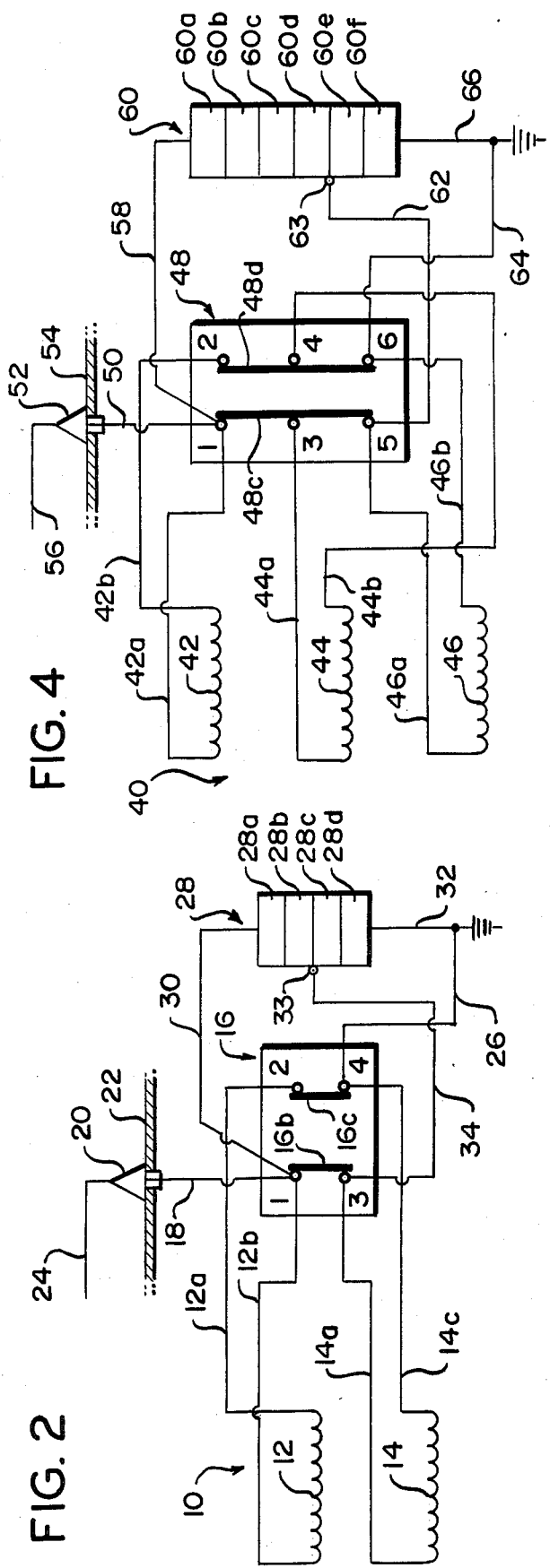

DUAL VOLTAGE DISTRIBUTION TRANSFORMER WITH INTERNAL VARISTOR SURGE PROTECTION

BACKGROUND OF THE INVENTION

The present invention relates to electrical transformers, and particularly to voltage surge or impulse protection for dual voltage distribution transformers.

Dual voltage distribution transformers are generally understood in the art as being those transformers having a dual voltage rating, typically a high voltage rating and a low voltage rating. Such transformers are capable of operating at either rating simply by connecting a plurality of primary, typically high voltage windings in series to effect the high voltage rating or in parallel to effect the low voltage rating. To conveniently convert from one voltage rating to the other, a switch, commonly referred to as a series-multiple switch or a dual voltage switch, is utilized. For example, a transformer may be equipped with a plurality of 7,200 volt primary windings, which if connected in parallel provide a 7,200 voltage rated transformer. On the other hand, if these plural primary windings are connected in series, the transformer's voltage rating is 7,200 volts multiplied by the number of primary windings so connected.

A typical application for dual voltage distribution transformers is in distribution circuits that are slated for eventual voltage uprating. The utility installs the transformer with its primary windings connected in parallel to establish the low voltage rating. Customers are served at this low voltage rating while the distribution circuit is prepared for voltage uprating. This involves changing out other distribution transformers, re-spacing distribution conductors, installing lightning arresters rated for the eventual higher distribution circuit voltage, etc. While voltage uprating the dual voltage distribution transformer is effected quickly simply by operation of the dual voltage switch, preparing the remainder of the distribution circuit for voltage uprating may take months, even years. In the meantime, if the dual voltage transformer, while connected in accordance with its lower voltage rating, is insulated at the basic impulse level (BIL) consistent with the voltage ratings of the individual primary windings but is protected by external lightning arresters rated in terms of voltage protection level according to the eventual higher distribution circuit voltage, the parallel connected primary windings are extremely vulnerable to damage by lightning induced surges. Consequently, to protect dual voltage distribution transformers during this vulnerable period, the high voltage primary windings must be insulated to a higher basic impulse level to safeguard the transformer up to the higher surge arrester protection level corresponding to the eventual higher voltage rating. This involves placing extra insulation between the turns or layers of the high voltage primary windings; such extra insulation being unnecessary when the primary windings are series connected to establish the higher transformer voltage rating assuming a properly rated external surge arrester has been installed.

In commonly assigned, copending application entitled "Distribution Transformer With Surge Protection Device", Ser. No. 673,214, filed Nov. 20, 1984, the disclosure of which is specifically incorporated herein by reference, plural arrester elements are located within the transformer tank and respectively electrically connected across sections of a single high voltage primary winding of a distribution transformer to afford enhanced voltage surge protection. It has been found that this arrangement provides unique primary winding protection against voltage surges entering the transformer via the low voltage secondary winding terminals, as well as via the high voltage primary winding terminals. This approach is a significant improvement over the traditional approach to distribution transformer surge protection of connecting external arresters across the primary winding terminals.

It is accordingly an object of the present invention to provide improved voltage surge protection for dual voltage distribution transformers.

An additional object is to provide full voltage surge protection for dual voltage distribution transformers while connected in either their higher or lower voltage rating configurations.

A further object is to provide a voltage surge protected, dual voltage distribution transformer which does not require the change out of external surge arresters when the transformer's voltage rating is changed, thus minimizing customer service interruptions.

Yet another object of the present invention is to provide a dual voltage distribution transformer of the above-character which is protected against voltage surges without the necessity of installing external arresters.

An additional object is to provide a dual voltage distribution transformer of the above-character wherein the levels of voltage surge protection can be closely tailored to the voltage ratings of the transformer, thus permitting reductions in the insulation levels to which the transformer must be designed.

Another object is to provide a dual voltage distribution transformer of the above-character which is internally equipped with a multi-rated surge arrester whose voltage protection level is changed coincidentally with changes in the transformer's voltage rating.

Still another object is to provide a dual voltage distribution transformer of the above-character which is of a cost improved construction, efficient in operation and reliable over a long service life.

Other objects of the present invention will in part be obvious and in part appear hereinafter.

SUMMARY OF THE INVENTION

In accordance with the present invention, there is provided a dual voltage distribution transformer having at least two high voltage primary windings which are connected in series to establish the transformer's higher voltage rating and connected in parallel to establish the transformer's lower voltage rating. The changeover from one voltage rating to the other is effected by changeable connector means such as a dual voltage switch. To afford full voltage surge protection for the distribution transformer regardless of which of these two voltage ratings it is operating at, a multi-rated surge arrester is situated within the transformer tank and is comprised of plural arrester sections which are individually connected by the dual voltage switch across the plural primary windings when the transformer is to operate at its higher voltage rating. However, when the distribution transformer is to operate at its lower voltage rating, the switch connects just one of the surge arrester sections across the parallel combination of the plural high voltage primary windings. By virtue of this construction, the voltage protection levels of the arrester sections can be conveniently selected to adequately and continuously protect the primary windings of the transformer at either of its voltage ratings. Since the changeover of primary winding connections and arrester connections are effected concurrently, the distribution transformer is never subjected to a period of vulnerability during distribution circuit changeover from one voltage rating to the other. As a consequence, the dual voltage distribution transformer need not be designed with extra levels of primary winding insulation to withstand voltage surges at one voltage rating that are not needed at the other voltage rating.

The invention accordingly comprises the features of construction, combinations of elements and arrangements of parts which will be exemplified in the constructions hereinafter set forth, and the scope of the invention will be indicated in the claims.

For a better understanding of the nature and objects of the invention, reference should be had to the following detailed description taken in conjunction with the accompanying drawings, in which:

FIG. 1 is a circuit diagram of a dual voltage distribution transformer having two series-connected primary windings which are surge protected in accordance with the present invention;

FIG. 2 is a circuit diagram of the surge protected dual voltage distribution transformer of FIG. 1 with its two primary windings connected in parallel;

FIG. 3 is a circuit diagram of a dual voltage distribution transformer having three series-connected primary winding which are surge protected in accordance with the present invention;

FIG. 4 is a circuit diagram of the surge protected dual voltage distribution transformer of FIG. 3 with its three primary windings connected in parallel.

Corresponding reference numerals refer to like parts throughout the several views of the drawings.

DETAILED DESCRIPTION

Referring to FIG. 1, there is shown a schematic diagram of the primary circuit of a dual voltage distribution transformer, generally indicated at 10, having a pair of high voltage primary windings 12 and 14. For the sake of clarity, other parts of the transformer, such as the secondary winding circuit, core, etc., have been omitted from the drawings. Terminations 12a and 12b of primary winding 12 are electrically connected to terminals 1 and 2, respectively, of a conventional dual voltage switch, generally indicated at 16. Switch terminal 1 is also connected via a conductor 18 and a bushing 20 penetrating a wall of a transformer tank, fragmentarily indicated at 22, to a high voltage line 24. Terminations 14a and 14b of primary winding 14 are respectively electrically connected to switch terminals 3 and 4, with the latter connected to ground via conductor 26. Switch 16 is shown in FIG. 1 in its series condition with its terminals 2 and 3 electrically bridged by a switch member 16a, which is seen to connect primary windings 12 and 14 in series between high voltage line 24 and ground. Assuming each primary winding to have a 7,200 volt rating, their series connection via switch 16 establishes a 14,400 volt rating for transformer 10.

Still referring to FIG. 1, a voltage surge arrester, generally indicated at 28 and disposed internally of tank 22, is connected at one end in common with switch terminal 1 via conductor 30 and at its opposite end to ground by lead 32, such as to be connected in shunt with the transformer primary winding circuit between the line voltage on line 24 and ground. The arrester consists of a stack of varistor elements 28a–28d, typically in the shape of discs having electrodes applied to their opposed major surfaces. These varistor elements are held in the stack with the electrodes of adjacent elements in surface contacting engagement and thus are electrically interconnected in series with the exposed electrode of varistor 28a at the upper end of the stack connected with conduction 30 and the exposed electrode of varistor 28d at the lower end of the stack connected with conductor 32. The varistor elements are preferably metal oxide varistors, such as zinc oxide. Such varistor elements are commercially available in a variety of voltage protection level ratings and thus are selected for utilization in the present invention in correlation with the voltage rating and basic impulse level design of the primary winding's insulation system. Thus, assuming each primary winding 12 and 14 to be rated at 7,200 volts, each varistor element may be selected to have a 4.5 kilovolt rating to provide an overall arrester voltage protection level of 18 kV, which is ample surge protection for the 14.4 kV rating of transformer 10 established by the series connection of primary windings 12 and 14 and consistent with a normal basic impulse level (BIL) design. As an important feature of the present invention and incidentally to provide enhanced surge protection in accordance with the teachings of the above-noted copending application, Ser. No. 673,214, the midpoint of the internal arrester stack, i.e., the electrode junction between varistor elements 28b and 28c, is tapped at 33 and connected by a conductor 34 to switch terminal 3. It is thus seen in FIG. 1 that primary winding 12 is shunted by a first section of arrester 28 comprised of varistor elements 28a and 28b to provide therefor a voltage protection level of 9 kV in the assumed example, while primary winding 14 is shunted by a second section thereof comprised of varistor elements 28c and 28d and is thus afforded a voltage protection level of also 9 kV. It will be appreciated that the varistor elements may be individually rated at 3 kV, in which case each arrester section would have three varistor elements.

Turning to FIG. 2, switch 16 is now diagrammatically illustrated in its multiple condition with its terminal 1 and 3 bridged by a switch member 16b and its terminals 2 and 4 bridged by a switch member 16c. As such, primary windings 12 and 14 are connected in parallel across line voltage and ground to establish the lower voltage rating for transformer 10, which is one-half the higher voltage rating established when the switch is in its series condition of FIG. 1. This being the case, the voltage protection level of arrester 28 should also be reduced accordingly. As seen in FIG. 2, thus reduction is achieved automatically upon switch 16 assuming its multiple condition in that the first arrester section (varistor elements 28a and 28b) is now short-circuited via conductor 30, switch member 16b and conductor 34, leaving the second arrester section (varistor elements 28c and 28d) to shunt and thus protect the parallel combination of primary windings 12 and 14. Assuming, as above, 7,200 volt ratings for each primary winding and 4.5 kV ratings for each varistor element, the primary windings are protected at a 9 kV level by varistor elements 28c and 28d while transformer 10 is operating at its lower, 7,200 volt rating. It is thus seen that the multi-rated voltage protection level capability of surge arrester 28 provides ample protection at both transformer ratings, thus in effect affording transformer 10 a dual basic impulse level (BIL). That is, the present invention avoids the necessity of having to add extra primary winding insulation for protection up to the 18 kV protection level of the full arrester stack when the primary windings are connected in parallel.

In FIG. 3, there is schematically illustrated a dual voltage distribution transformer 40 having three primary windings 42, 44 and 46 of equal voltage ratings. The terminations 42a and 42b of winding 42 are respectively connected to terminals 1 and 2 of a dual voltage switch 48. The terminations 44a and 44b are respectively connected to switch terminals 3 and 4, while terminations 46a and 46b are respectfully connected to switch terminals 5 and 6. Switch terminal 1 is also connected by a conductor 50 and a bushing 52, penetrating transformer tank wall 54, to high voltage line 56 and further by a conductor 58 to the upper end of an internal arrester, generally indicated at 60 and comprised of a series connected stack of varistor elements 60a–60f. Switch terminal 5 is connected via a conductor 62 to a tap 63 at the electrode junction between varistor elements 60d and 60e, while switch terminal 6 is grounded by a conductor 64, as is the lower end of the varistor stack by a conductor 66.

Switch 48 is diagrammatically illustrated in FIG. 3 to be in its series condition with a switch member 48a bridging switch terminals 2 and 3 and switch member 48b bridging switch terminals 4 and 5. As a result, primary windings 42, 44 and 46 are connected in series between high voltage line 56 and ground to establish the higher voltage rating for dual voltage transformer 40. To surge protect this series connected primary winding circuit, it is seen that a first section of arrester 60 comprised of varistor elements 60a–60d is connected by switch 48 across the series combination of primary windings 42 and 44, while a second arrester section comprised of varistor elements 60e and 60f is connected by the switch across primary winding 46. Assuming 7,200 volt ratings for each primary winding and 4.5 KV ratings for each varistor element, it is seen that arrester 60 provides a 27 kV protection level while dual voltage transformer is conditioned by switch 48 to operate at its higher, 21,600 volt rating. It is further seen that series-connected primary windings 42 and 44 are afforded a protection level of 18 kV by varistor elements 60a–60d, and winding 46 is afforded a protection level of 9 kV by varistor elements 60e and 60f.

In FIG. 4, switch 48 is shown in its multiple condition, with switch member 48c bridging switch terminals 1, 3 and 5 and switch member 48d bridging switch terminals 2, 4 and 6. This is seen to connect the three primary windings in parallel to establish the lower voltage rating for dual voltage transformer 40. To properly surge protect the primary winding circuit in this configuration, the second arrester section (varistor elements 60e–60f) is automatically connected across the parallel combination of the three primary windings, while the first arrester section (varistor elements 60a and 60d) is short-circuited by conductors 58, 62 and switch member 48c. In the assumed example, transformer 40 is now protected at the combined protection level of the two 4.5 kV varistor elements 60e and 60f, i.e., 9 kV, while operating at its lower 7,200 volt rating.

It will be appreciated that the electrode junction between varistor elements 60b and 60c could be connected to switch terminal 3, as shown in phantom in FIG. 3, to create, in effect, three arrester sections which individually shunt the three primary windings at the high voltage rating, while the arrester section of varistor elements 60e and 60f still shunts the parallel combination of the three primary windings at the low voltage rating. This additional arrester tap would provide a more linearized surge voltage distribution across the primary windings while connected in series. Moreover, while it is preferable to utilize a dual voltage switch to change the interconnections of the primary windings, it will be understood that the primary windings may be terminated at a terminal board and their series/multiple interconnections selectively effected by jumper cables. Although the invention has been disclosed in its application to dual voltage distribution transformers, it will be appreciated by those skilled in the art that the invention has general application to other types of transformers having multiple rating compatibilities. While the drawings illustrate a single phase transformer, it will be appreciated that the structure shown may be duplicated to apply the invention to a three phase transformer.

It will also be appreciated by those skilled in the art that the present invention is equally applicable to dual voltage transformers whose series connected rating is not a whole number multiple of its parallel connected rating. That is, a portion of one of the primary windings may be tapped out of the circuit in the series connected configuration, resulting in a high voltage rating which is less than the low voltage rating multiplied by the number of primary windings. Conversely, a portion of one of the primary windings may be extended to achieve a high voltage rating which is greater than the low voltage rating multiplied by the number of primary windings. Moreover, the invention is applicable to dual voltage transformers whose low voltage rating is achieved by connecting their primary windings in a series-parallel configuration. Thus, with three primary windings, the low voltage rating is two-thirds of the high voltage rating, rather than one-third as in the case of the illustrated embodiments. As is well understood in the art, those of the windings connected in parallel must have equal voltage ratings to avoid circulating currents. While the illustrated embodiments show the arrester section of the surge arrester nearest ground being the one connected across the paralleled primary windings, it will be appreciated that one of the other arrester sections may be so-connected if the dual voltage switch provides it with a direct electrical connection to ground. Also, the teachings of the invention are applicable to the voltage surge protection of transformer windings other than primary windings in those situations where the basic impulse level design requirements differ depending upon how the windings are interconnected to establish the various voltage ratings.

From the foregoing description, it is seen that the present invention provides a multi-voltage rated surge arrester for fully protecting a dual voltage distribution transformer against lightning strikes and switching transients regardless of whether it is operating in its higher or lower voltage rating. As a consequence, the transformer need never be subjected to the situation of being inadequately protected at a high arrester voltage level designed for operation at its high voltage rating while in fact operating at its low voltage rating. Thus, the extra primary winding layer insulation to protect the transformer under these circumstances becomes unnecessary. Reduction in layer insulation also provides thermal benefits permitting fewer coil cooling ducts and smaller tank radiators. The space otherwise occupied by this extra layer insulation can be advantageously utilized to accommodate increased coil conductor cross-section, thus providing a significant gain in loss evaluation, or to accommodate a reduction in core size and weight. Moreover, the multi-rating surge arrester capability afforded by the present invention avoids the costly changeout of external arresters necessitated by distribution system voltage uprating and downrating. Also by mounting the multi-rated surge arrester of the present invention within the tank of a dual voltage distribution transformer, significant costs associated with externally installed surge arresters are avoided. As taught in the above-noted application Ser. No. 673,214, tapping a high voltage winding circuit into a surge arrester stack uniquely reduces the stresses imposed thereon by voltage surges introduced via the low voltage winding terminals. This protection is extremely important for shell-type distribution transformers with non-interlaced low voltage windings. It is also beneficial for core-type distribution transformers by virtue of the reduction in winding insulation so afforded.

It will thus be seen that the objects set forth above, including those made apparent in the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. A dual voltage distribution transformer comprising, in combination:
   A. a transformer tank;
   B. at least first and second primary windings disposed within said tank, said first primary winding having a first termination for connection to line voltage and a second termination, and said second primary winding having a third termination and a fourth termination for connection to ground;
   C. a switch operable in a first condition to connect said second and third primary winding terminations in series, such as to connect said first and second primary windings in series, said switch operable in a second condition to connect said first and third winding terminations in common and to connect said second and fourth winding terminations in common, such as to connect said first and second primary windings in parallel;
   D. a plurality of varistor elements disposed within said tank, said varistor elements electrically connected in series and physically arranged in a stack having opposed first and second electrode ends, said first stack end electrically connected with said first primary winding termination and said second stack end electrically connected with said fourth primary winding termination, said stack further including an intermediate connection point at a location between adjacent ones of said varistor elements, said connection point electrically connected with said third primary winding termination.

2. The dual voltage distribution transformer defined in claim 1, which further includes a third primary winding having fifth and sixth terminations, said switch, in its said first condition, connecting said fifth termination in common with said second termination and said sixth termination in common with said third termination such as to connect said third primary winding in series between said first and second primary windings, and, in its said second condition, connecting said fifth termination in common with said first and third terminations and said sixth termination in common with said second and fourth terminations.

3. The dual voltage distribution transformer defined in claim 1, wherein said varistor elements are metal oxide varistors.

4. A dual voltage distribution transformer comprising, in combination:
   A. at least first and second primary windings;
   B. a surge arrester having first and second arrester sections electrically connected in series, each said arrester section including at least one varistor element; and
   C. connector means capable of assuming
      (1) a first condition electrical connecting said first and second primary windings in series with said first arrester section shunting said first primary winding and said second arrester section shunting said second primary winding, and
      (2) a second condition connecting said first and second primary windings in parallel with one of said first and second arrester sections shunting said parallel connected first and second primary windings.

5. The dual voltage distribution transformer defined in claim 4, wherein said connector means short-circuits the other of said first and second arrestor sections in its said second condition.

6. The dual voltage distribution transformer defined in claim 5, which further includes a third primary winding, said connector means in its said first condition electrically connecting said third primary winding in series with said first and second primary windings with said first arrester section shunting said first and third primary windings and said second arrester section shunting said second primary winding, and said connector means in its said second condition connecting said first, second and third primary windings in parallel with said second arrester section shunting said parallel connected first, second and third primary windings.

7. The dual voltage distribution transformer defined in claim 5, which further includes a tank in which said primary windings and said surge arrester are disposed.

8. The dual voltage distribution transformer defined in claim 6 which further include a tank in which said primary windings and said surge arrester are disposed.

9. The dual voltage distribution transformer defined in claim 5, wherein said connector means is a dual voltage switch.

10. The dual voltage distribution transformer defined in claim 6, wherein said connector means is a dual voltage switch.

11. A dual voltage transformer comprising, in combination:
   A. a transformer tank;
   B. a winding circuit disposed in said tank, said circuit having a first and second terminations and including at least first and second winding portions;
   C. a multi-rated voltage surge arrester disposed in said tank and comprising a plurality of varistor elements each consisting of a body of varistor material with electrodes applied to opposed major surfaces thereof, said varistor elements arranged in a stack in series electrical interconnection, the electrode exposed at one end of said stack connected with said first winding circuit termination and the electrode exposed at the other end of said stack connected with said second winding circuit termination, said arrester further including at least one intermediate tap connected to a selected electrode junction between adjacent varistor elements within said stack; and D. series-multiple connector means operable
  (1) in a first condition to connect said first and second winding portions in series between said winding circuit first and second terminations with said intermediate tap connected to a junction between said first and second winding portions, and
  (2) in a second condition to connect said first and second winding portions in parallel between said winding circuit first and second terminations with those of said varistor elements between said tap and said other end of said stack connected across said first and second terminations and to connect those of said varistor elements between said tap and said one end of said stack in short-circuit.

12. The dual voltage transformer defined in claim 11, wherein said connector means comprises a dual voltage switch.

13. The dual voltage transformer defined in claim 11, wherein said varistor elements are zinc oxide varistors.

14. The dual voltage transformer defined in claim 13, wherein each said zinc oxide varistor is equally rated in voltage impulse protection level.

15. The dual voltage transformer defined in claim 11, wherein the voltage impulse protection level of those of said varistor elements between said tap and said one end of said stack is correlated with the basic impulse level of said first winding portion and the voltage impulse protection level of those of said varistor elements between said tap and the other end of said stack is correlated with the basic impulse level of said second winding portion.

16. The dual voltage transformer defined in claim 15, wherein said first winding portion comprises separate first and second primary windings and said second winding portion comprises a separate third primary winding, said connector means, in its said first condition, connecting said first, second and third primary windings in series, and, in its said second condition, connecting said first, second and third primary windings in parallel.

* * * * *